United States Patent [19]

Rechsteiner

[11] Patent Number: 4,848,558

[45] Date of Patent: Jul. 18, 1989

[54] CONVEYOR FOR UPRIGHT-ORIENTED FLAT ARTICLES

[75] Inventor: Markus Rechsteiner, Schaffhausen, Switzerland

[73] Assignee: Sig Schweizerische Industrie-Gesellschaft, Neuhausen am Rheinfall, Switzerland

[21] Appl. No.: 215,621

[22] Filed: Jul. 6, 1988

[30] Foreign Application Priority Data

Jul. 23, 1987 [CH] Switzerland .......................... 2799/87

[51] Int. Cl.$^4$ ............................................... B65G 37/00
[52] U.S. Cl. ..................................... 198/369; 198/436; 198/600
[58] Field of Search ............... 198/366, 369, 360, 436, 198/435, 592, 600

[56] References Cited

U.S. PATENT DOCUMENTS

| 1,407,923 | 2/1922 | Buck | 198/360 |
| 1,495,459 | 5/1924 | Thompson | 198/360 |
| 2,804,192 | 8/1957 | Armstrong et al. | 198/369 |
| 3,467,238 | 9/1969 | Fry et al. | 198/369 |
| 4,016,969 | 4/1977 | Brand | 198/435 |
| 4,050,573 | 9/1977 | Muller | 198/366 |
| 4,424,966 | 1/1984 | Chandhoke | 198/369 |
| 4,426,074 | 1/1984 | Fischer | 198/369 |
| 4,431,104 | 2/1984 | Orlowski et al. | 198/435 |
| 4,541,824 | 9/1985 | Muller | 198/435 |
| 4,553,658 | 11/1985 | Gasser . | |

FOREIGN PATENT DOCUMENTS 268144 1/1969 Austria ................................ 198/592

Primary Examiner—Joseph E. Valenza
Attorney, Agent, or Firm—Spencer & Frank

[57] ABSTRACT

A conveyor apparatus comprises a plurality of side-by-side arranged first conveyors lying in a first plane. Each first conveyor has a pivotal first conveyor belt portion adapted to assume a first pivotal position in which articles continue to be advanced on the first conveyor and a second pivotal position in which articles are deviated from the first conveyor. The conveyor apparatus has a second conveyor which lies in a second plane spaced vertically from the first plane and which traverses each first conveyor at a location of crossing downstream of the downstream end of the first conveyor belt portions. The second conveyor includes a plurality of pivotal second conveyor belt portions adapted to assume a first pivotal position in which the upstream end of the respective second conveyor belt portion is in alignment with the second conveyor, and a second pivotal position in which the upstream end of the second conveyor belt portion is out of alignment with the second conveyor. There is further provided a separate third conveyor situated at each location of crossing and lying in a third plane between the first and second planes; each third conveyor having first and second ends. At any location of crossing, the third conveyor is in operative alignment with the first conveyor belt portion in the second pivotal position of the first conveyor belt portion and the third conveyor is in operative alignment with the second conveyor belt portion in the second pivotal position of the second conveyor belt portion.

9 Claims, 5 Drawing Sheets

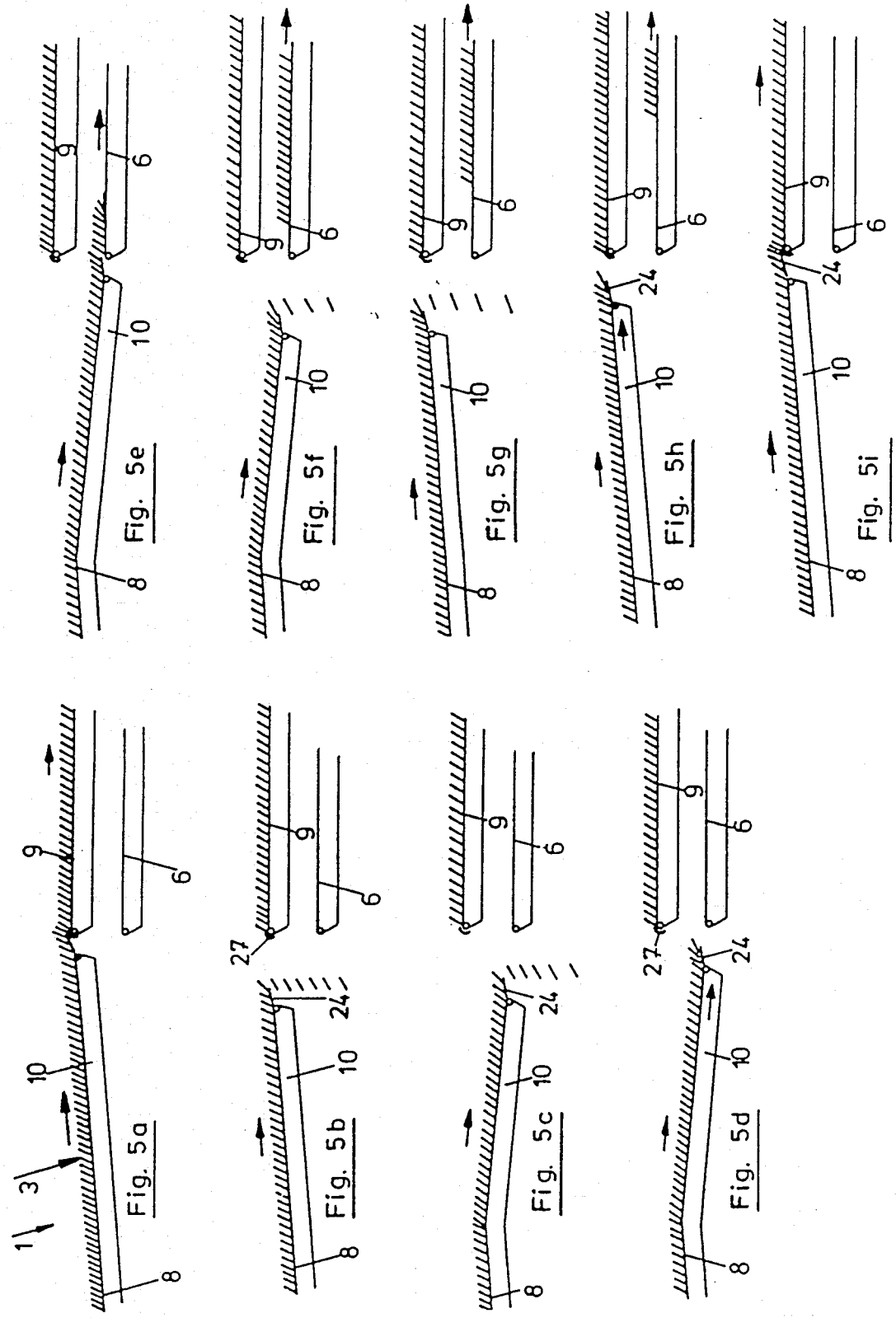

CONVEYOR FOR UPRIGHT-ORIENTED FLAT ARTICLES

BACKGROUND OF THE INVENTION

This invention relates to a conveyor apparatus having a plurality of side-by-side arranged conveyor tracks, situated in a first plane, for advancing edgewise upright-oriented face-to-face engaging flat articles such as confectionery items (cookies, biscuits, crackers or the like) to separate packing machines, one associated with each conveyor track. The conveyor apparatus further includes an additional conveyor for advancing the items from one selected conveyor track to a standby packing machine. Each conveyor track has a conveyor belt portion which is pivotal about a horizontal axis oriented perpendicularly to the direction of advance. In its normal position, the conveyor belt portion advances the articles to a further portion of the same conveyor track, while in another pivotal position it advances the articles to the additional conveyor apparatus.

A conveyor apparatus of the above-outlined type is known and is disclosed, for example, in U.S. Pat. No. 4,553,658. The known apparatus is adapted to handle elongated bar-shaped articles such as chocolate bars, rather than disc or wafer-shaped items. The known apparatus includes a plurality of parallel-arranged conveyor tracks situated in an upper plane for advancing items to separate packing machines. Each conveyor track is equipped with a routing device by means of which, in case of a standstill of the associated packing machine, the stream of articles can be detoured to an accumulating or storage belt situated underneath the conveyor track. A horizontally pivotal removal conveyor belt is aligned with the storage belt and advances the items to a standby packing machine. While this apparatus has proved to be efficient in operation, it has the disadvantage that it has a substantial spatial requirement.

SUMMARY OF THE INVENTION

It is an object of the invention to provide an improved conveyor apparatus of the above-outlined type which is adapted to convey edgewise upright-oriented flat items in a face-to-face, stacked relationship and has a significantly reduced spatial requirement compared to prior art constructions.

This object and others to become apparent as the specification progresses, are accomplished by the invention, according to which, briefly stated, the conveyor apparatus comprises a plurality of side-by-side arranged first conveyors lying in a first plane. Each first conveyor has a pivotal first conveyor belt portion adapted to assume a first pivotal position in which articles continue to be advanced on the first conveyor and a second pivotal position in which articles are deviated from the first conveyor. The conveyor apparatus has a second conveyor which lies in a second plane spaced vertically from the first plane and which traverses each first conveyor at a location of crossing downstream of the downstream end of the first conveyor belt portions. The second conveyor includes a plurality of pivotal second conveyor belt portions adapted to assume a first pivotal position in which the upstream end of the respective second conveyor belt portion is in alignment with the second conveyor, and a second pivotal position in which the upstream end of the second conveyor belt portion is out of alignment with the second conveyor. There is further provided a separate third conveyor situated at each location of crossing and lying in a third plane between the first and second planes; each third conveyor having first and second ends. At any location of crossing, the third conveyor is in operative alignment with the first conveyor belt portion in the second pivotal position of the first conveyor belt portion and the third conveyor is in operative alignment with the second conveyor belt portion in the second pivotal position of the second conveyor belt portion.

BRIEF DESCRIPTION OF THE DRAWING

FIGS. 5a–5i are schematic side elevational views illustrating the sequence of the switching process practiced by the preferred embodiment.

DESCRIPTION OF THE PREFERRED EMBODIMENT

Figure 1:
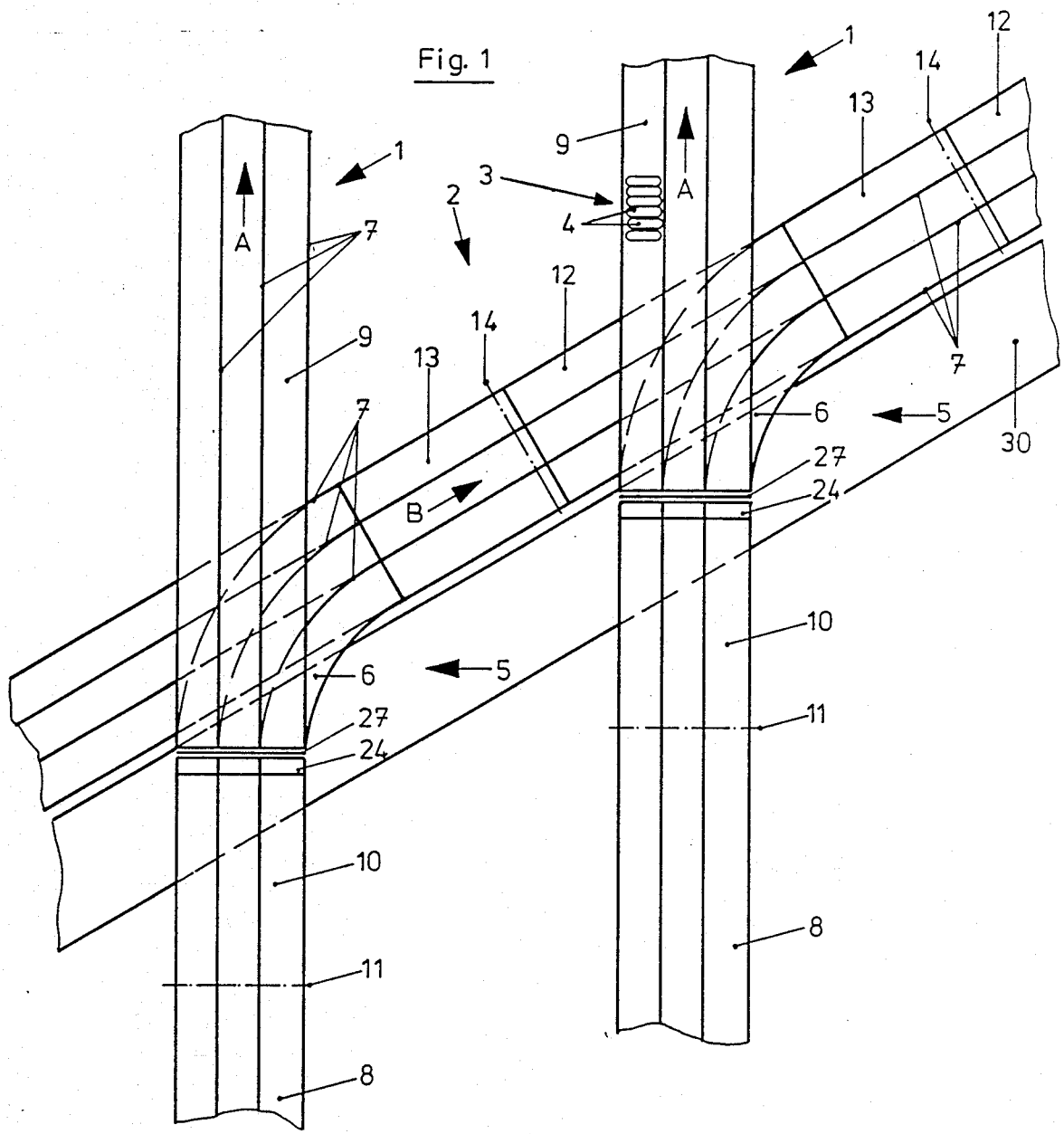
FIG. 1 is a schematic top plan view of a preferred embodiment of the invention.

Turning to FIG. 1, there is illustrated a preferred embodiment of the apparatus in a schematic plan view. The apparatus includes a plurality of conveyor tracks 1 situated in a first plane. For the sake of clarity, only two parallel-arranged conveyor tracks are shown, while in reality a greater number of conveyor tracks lying in a first plane may be utilized. Underneath the conveyor tracks 1, in a second plane, the conveyor tracks 1 are traversed by a conveyor apparatus 2 at an angle of between 20° and 90°. Each conveyor track 1 is divided into a plurality of conveyor lanes by longitudinally extending, parallel-spaced stationary guide plates 7. In each lane a column 3 of edgewise standing, face-to-face contacting (stacked) flat articles 4 is advanced in a direction A from a stacking device (not shown) to a respective packing machine (also not shown).

As will be described in greater detail later, the conveyor apparatus 2 advances the items 4, taken from one of the conveyor tracks 1, in a conveying direction B to a standby packing machine (not shown) in case the packing machine associated with the respective conveyor track 1 is at a standstill.

At each crossing 5 between a conveyor track 1 and the conveyor apparatus 2 there is provided a curved conveyor belt 6 in a third plane situated between the first and second planes. The conveyor apparatus 2 and the curved conveyor 6 are also provided with lane-forming stationary guide plates 7.

Figure 2:
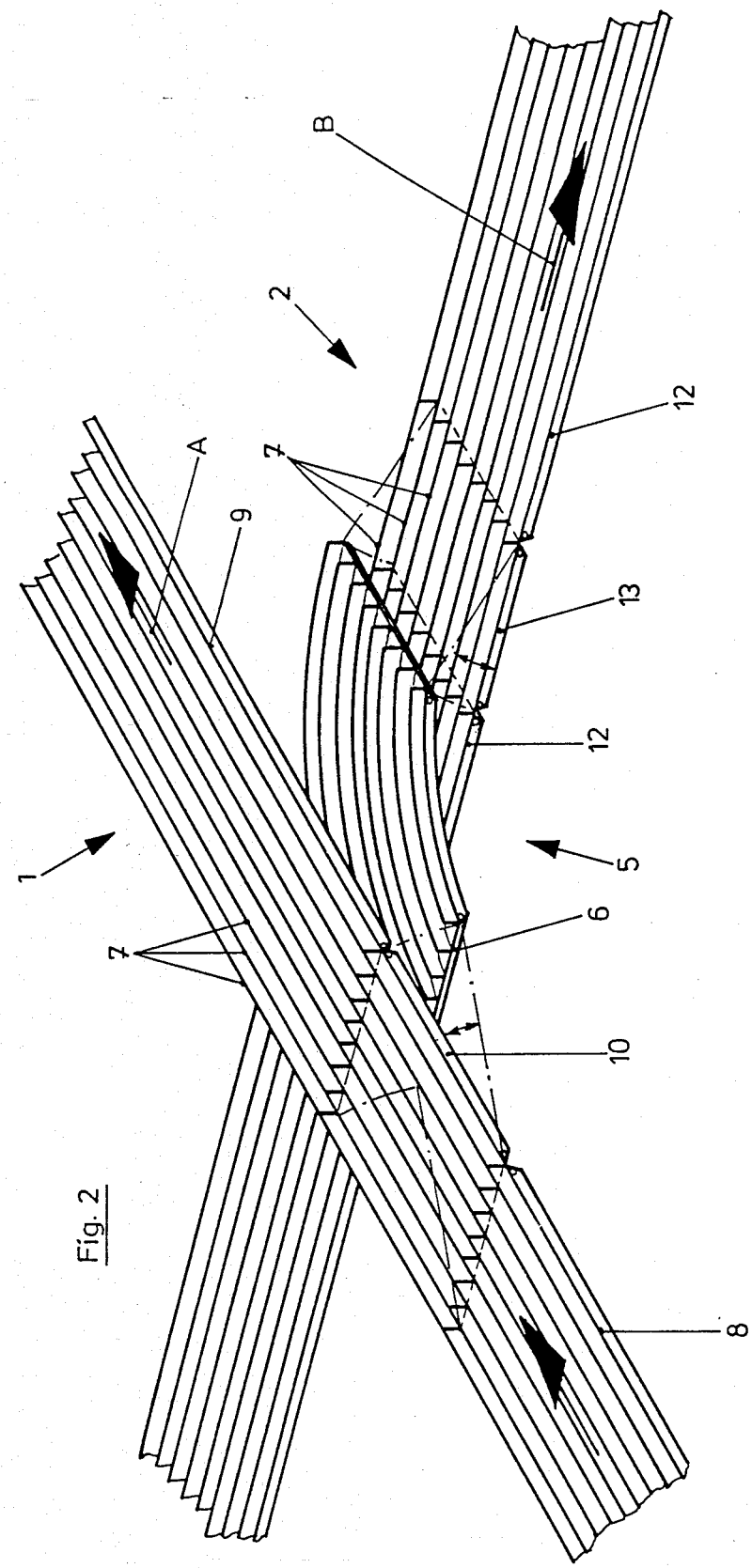
FIGS. 2 and 3 are schematic perspective views of the preferred embodiment illustrated in two operational positions.
Figure 3:
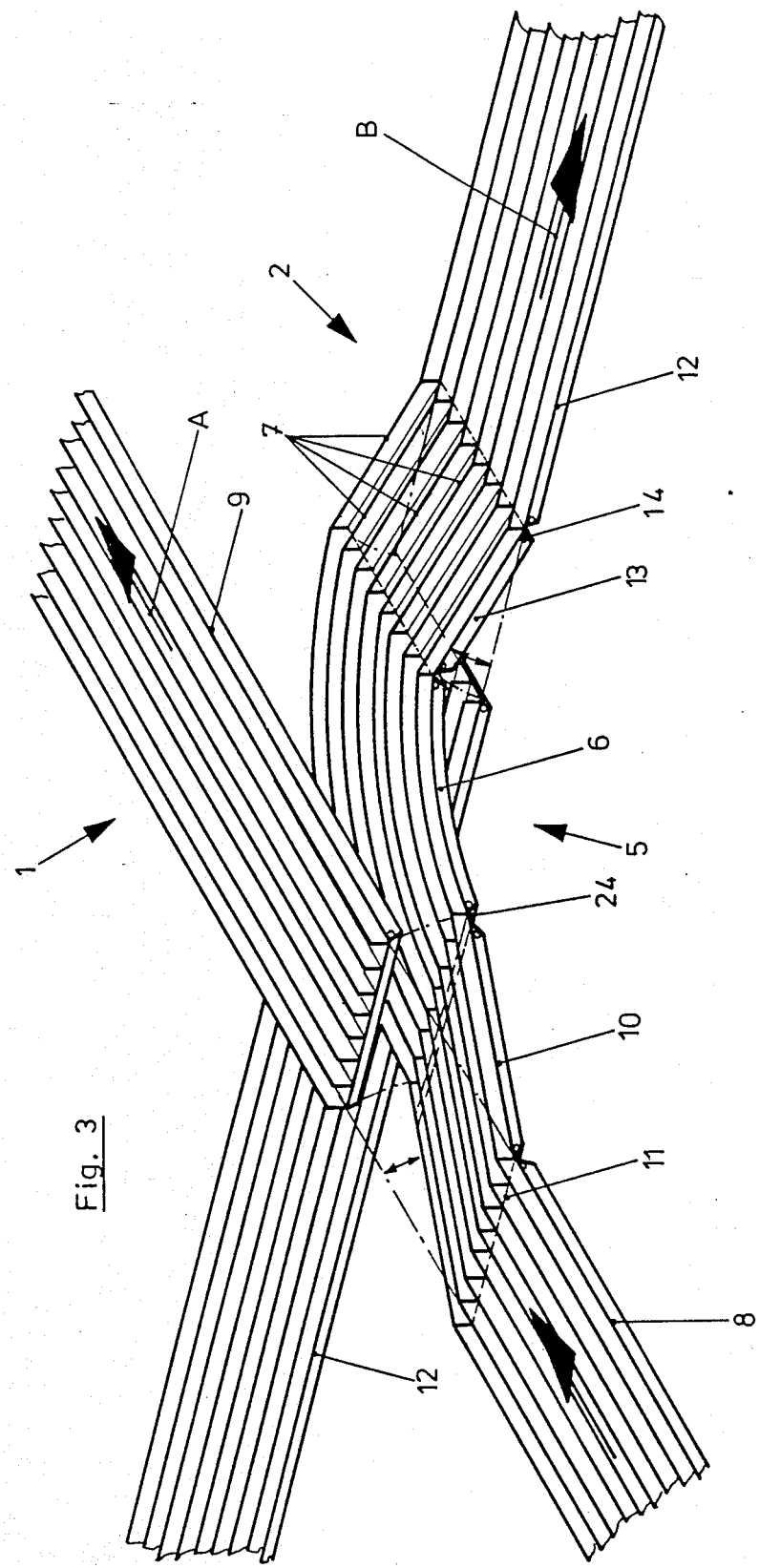

Each conveyor track 1 is formed of two longitudinally adjoining conveyor belts 8 and 9 in a vertical projection above the upstream end of the associated curved conveyor belt 6. The upstream conveyor belt 8 has at its downstream end a conveyor belt portion 10 which is pivotal in a vertical plane about a horizontal axis 11 oriented perpendicularly to the direction of advance A. In the basic (normal) position of the conveyor belt portion 10 as shown in FIGS. 2 and 4, its downstream end is aligned with the downstream conveyor belt 9 and in the downwardly pivoted, activated position shown in FIG. 3, the conveyor belt portion 10 is in alignment with the upstream end of the associated curved conveyor belt 6.

The conveyor apparatus 2 is formed of a plurality of longitudinally adjoining conveyor belt portions 12 and 13, of which each portion 13 is, at its downstream end, pivotal about an axis 14 oriented perpendicularly to the direction B. The upstream end of each partial conveyor 13 is, in its basic (normal) position in alignment with the upstream conveyor portion 12 and in an upward pivoted, activated position it is in alignment with the downstream end of the associated curved conveyor belt 6.

Figure 4:
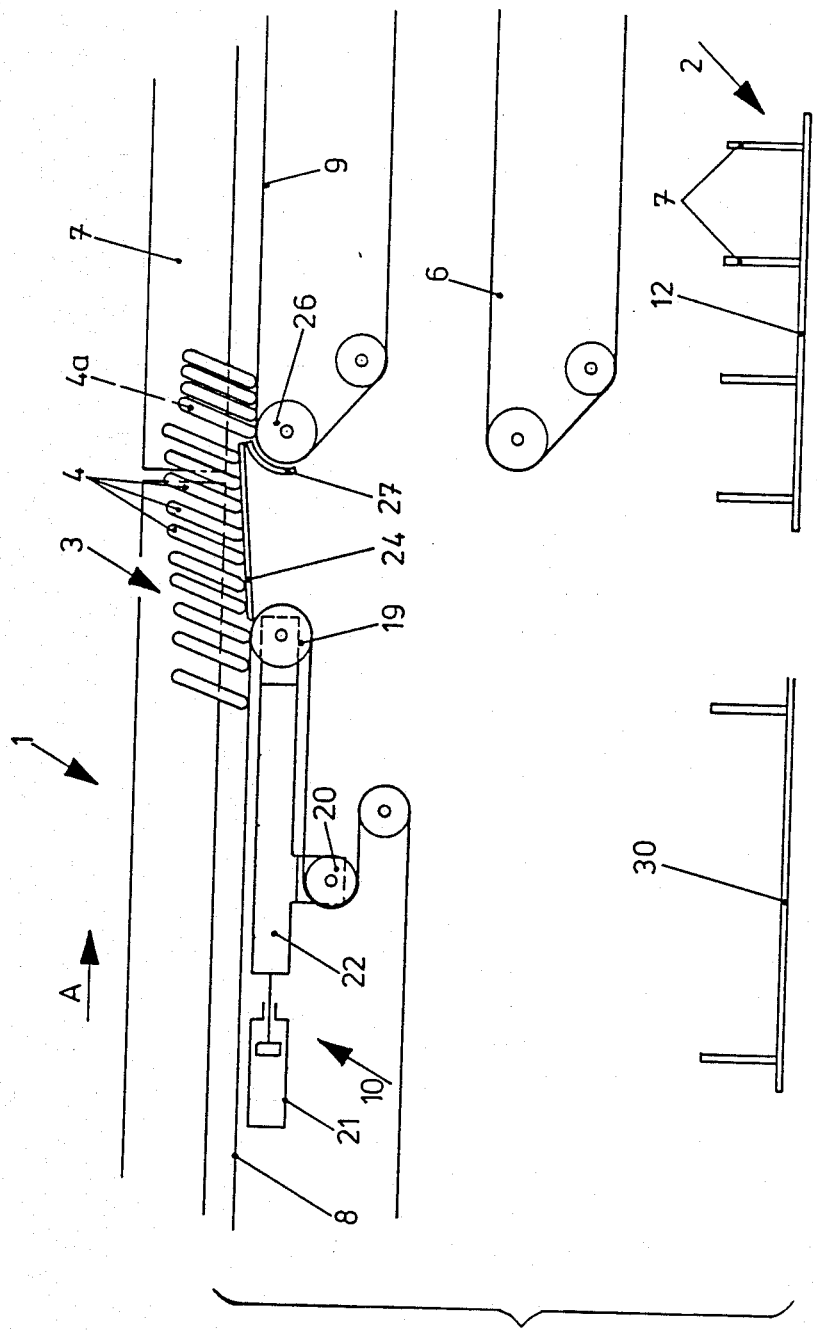
FIG. 4 is a schematic side elevational view of one part of the preferred embodiment.

Turning to FIG. 4, there is illustrated in detail the zone of transition between the conveyor belts 8 and 9. The downstream end of the conveyor belt 8 is, at the conveyor belt portion 10, guided about an end roller 19 which, together with a further deflecting roller 20 is supported on a sled 22. The sled 22 may be shifted back and forth by means of a pneumatic cylinder assembly 21. The downstream end of the conveyor belt 8 at the end roller 19 is adjoined by a stationary plate 24 mounted on the sled 22. Between the free downstream end of the stationary plate 24 and an upper deflecting roller 26 of the conveyor belt 9 there is arranged a curved retaining piece 27 whose distance from the roller 26 may be adjusted. The retaining piece 27 serves for supporting a trailing item 4a of an item column 3 on the conveyor 9 when the conveyor portion 10 is lowered. Upon such an occurrence, the item 4a wedges between the stationary belt 9 and the curved component 27. As a result of this arrangement, the column 3 situated on the conveyor belt 9 is prevented from falling over rearwardly.

The operation of the above-described apparatus will now be described with reference to the sequential FIGS. 5a–5i which illustrate the transition zone between the conveyor portion 10 of the conveyor belt 8 and the conveyor belt 9 or the curved conveyor 6, as the case may be.

FIG. 5a illustrates the normal condition, at which the conveyor track 1 advances an item column 3 to the associated packing machine. The belts 8 and 9 run with identical speed and the conveyor portion 10 is in its basic position.

As soon as a packing machine supplied by a conveyor track 1 interrupts its operation, the conveyor belt 9 of that track 1 is stopped and the sled 22 is withdrawn, as shown in FIG. 5b. The items 4 which continue to be advanced by the conveyor belt 8 drop at the downstream edge of the stationary plate 24 onto a waste conveyor belt 30 which runs adjacent the conveyor apparatus 2 upstream thereof as viewed in the conveying direction A.

As shown in FIG. 5c, thereafter the conveyor belt portion 10 is lowered and the sled 22 advanced. At the same time, the items 4 are held back at the stationary plate 24 as shown in FIG. 5d.

Turning to FIG. 5e, as soon as the sled 22 has reached its advanced terminal position, the free downstream end of the stationary plate 24 is in alignment with the upstream end of the curved conveyor belt 6. The item column 3 is then advanced by the curved conveyor belt 6 and the conveyor belt portion 13 which forms part of the conveyor apparatus 2 and which has been in the meantime pivoted upwardly. The articles are thus advanced by the conveyor apparatus 2 to the standby packing machine (not shown).

As soon as the idle packing machine resumes operation, the sled 22 is withdrawn as shown in FIG. 5f and the conveyor portion 10 is pivoted upwardly as shown in FIG. 5g. Thereafter, the sled 22 is advanced as shown in FIG. 5h until it has again reached its basic position illustrated in FIG. 5i. Thereafter, the conveyor belt 9 is restarted, whereby the normal operating condition of FIG. 1 is again reached.

The described apparatus is of simple and perspicuous construction, it requires little space and may be complemented easily by modular additions or may be adapted to diverse operational conditions. It makes possible a gentle handling of the articles whose orientation remains unchanged during the conveyance.

As a departure from the described preferred embodiment, the non-pivotal conveyor portions of the conveyor tracks 1 and the conveyor apparatus 2 may also be constituted by vibrating conveyors.

The present disclosure relates to subject matter contained in Swiss patent application No. 2799/87-5 (filed July 23rd, 1987) which is incorporated herein by reference.

It will be understood that the above description of the present invention is susceptible to various modifications, changes and adaptations, and the same are intended to be comprehended within the meaning and range of equivalents of the appended claims.

What is claimed is:

1. A conveyor apparatus comprising
    (a) a plurality of side-by-side arranged first conveyors lying in a first plane and arranged for conveying items in a first conveying direction; each first conveyor including a first conveyor belt portion having upstream and downstream ends as viewed in said first conveying direction; each said first conveyor belt portion being pivotal about an axis, situated at said upstream end and oriented perpendicularly to said first conveying direction, to assume a first pivotal position in which articles continue to be advanced on the first conveyor after passing through said downstream end, and a second pivotal position in which articles are deviated from the first conveyor after passing through said downstream end;
    (b) a second conveyor lying in a second plane spaced vertically from said first plane and arranged for conveying items in a second conveying direction; said second conveyor traverses each said first conveyor at a location of crossing downstream of the downstream end of the first conveyor belt portions of respective said first conveyors; said second conveyor including a plurality of second conveyor belt portions each having upstream and downstream ends as viewed in said second conveying direction; the upstream end of said second conveyor belt portions being downstream of respective said locations of crossing; each said second conveyor belt portion being pivotal about an axis, situated at said downstream end of each second conveyor belt portion and oriented perpendicularly to said second conveying direction, to assume a first pivotal position in which the upstream end of the second conveyor belt portion is in alignment with the second conveyor, and a second pivotal position in which the upstream end of the second conveyor belt portion is out of alignment with the second conveyor; and
    (c) a separate third conveyor situated at each said location of crossing and lying in a third plane between said first and second planes; each said third conveyor having first and second ends; at any said location of crossing, the first end of said third conveyor being in operative alignment with the downstream end of the first conveyor belt portion in the second pivotal position thereof and the second end of said third conveyor being in operative alignment with the upstream end of the second conveyor belt portion in the second pivotal position thereof.

2. A conveyor apparatus as defined in claim 1, wherein each said third conveyor has a curvilinear course.

3. A conveyor apparatus as defined in claim 1, wherein a vertical projection of the downstream end of each said first conveyor belt portion is situated adjacent said second conveyor.

4. A conveyor apparatus as defined in claim 1, further comprising means for shifting the downstream end of each said first conveyor belt portion in a direction parallel to said first conveying direction.

5. A conveyor apparatus as defined in claim 1, further comprising a stationary transfer plate secured to the downstream end of each said first conveyor portion.

6. A conveyor apparatus as defined in claim 1, further comprising a retaining element secured to each said first conveyor immediately downstream of the downstream end of respective said first belt conveyor portions for supporting a trailing article of edgewise upstanding, face-to-face engaged articles situated on a respective first conveyor downstream of the first conveyor belt portion thereof when the first conveyor belt portion is in the second pivotal position.

7. A conveyor apparatus as defined in claim 1, further comprising a removal conveyor extending adjacent said second conveyor on an upstream longitudinal side thereof, as viewed in said first conveying direction.

8. A conveyor apparatus as defined in claim 1, further comprising a plurality of side-by-side arranged stationary guide means for longitudinally dividing each first and third conveyor and said second conveyor in a plurality of side-byside arranged conveyor lanes.

9. A conveyor apparatus as defined in claim 1, wherein said second conveyor is arranged at an angle of between 20° and 90° to said first conveyors.

* * * * *